United States Patent Office 2,920,389
Patented Jan. 12, 1960

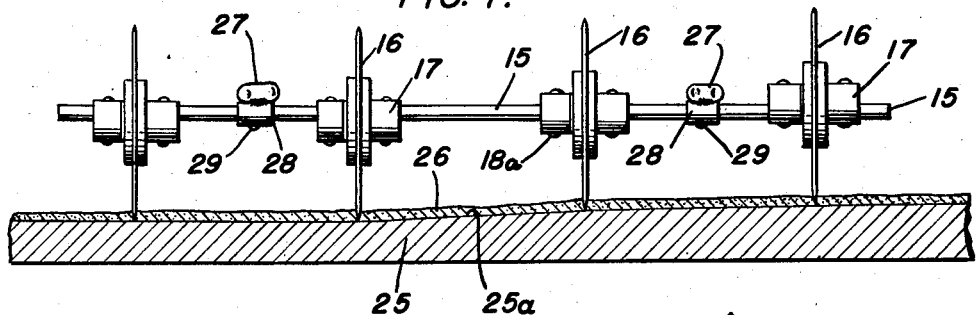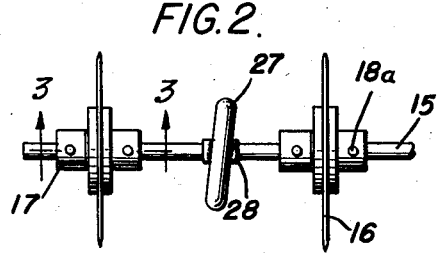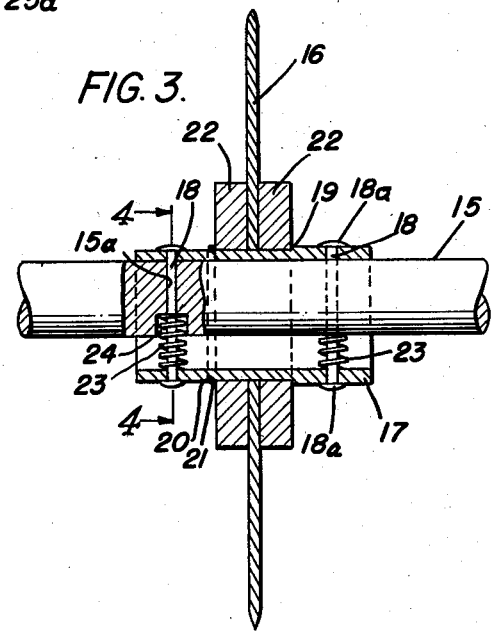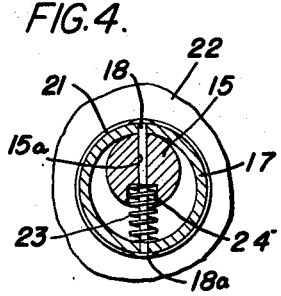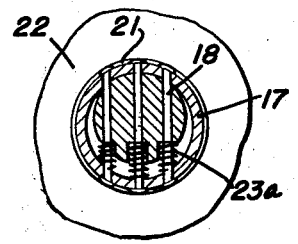

2,920,389

MEANS FOR MOUNTING A ROTARY ELEMENT OR AN AXLE

Eino R. Nurmi, Fresno, Calif.

Application August 30, 1956, Serial No. 607,250

2 Claims. (Cl. 30—307)

My invention relates to and has for its purpose the provision of a hand operated device for use in cutting dough incident to the making of bakery goods, and by which dough in sheet form as laid flatwise on a table, can be simultaneously cut into a plurality of strips, and irrespective of any variation in thickness of the dough sheet, or regardless of any unevenness in the surface of the table due to wear or other causes.

It is also a purpose of my invention to provide a hand operated dough cutting device which includes an axle upon which a plurality of cutting disks are rotatably supported on the axle, and resilient means by which the disks are mounted on the axle for individual yielding movement transversely thereof in such manner that when the axle is manually moved over a dough sheet-supporting table all of the disks will be simultaneously caused to cut and divided the sheet into strips, regardless of variation in thickness of the dough or unevenness in the surface of the table.

I will describe one form of my invention as embodied in a dough cutting device, and will then point out the novel features thereof in the claims.

In the accompanying drawing:

Fig. 1 is a view showing in front elevation one form of dough cutting device embodying my invention in cutting position on a table having a sheet of dough thereon.

Fig. 2 is a fragmentary top plan view of the device shown in Fig. 1.

Fig. 3 is an enlarged sectional view taken on the line 3—3 of Fig. 2.

Fig. 4 is a vertical sectional view taken on the line 4—4 of Fig. 3.

Fig. 5 is a view similar to Fig. 4 showing another embodiment of my invention.

Referring more particularly to the drawing, in Figs. 1 to 4 I have shown by invention as embodied in a dough cutting device which will be described as being manually operated, but it is to be understood that it may be power operated if so desired. This device comprises an axle 15 upon which dough cutting disks 16 are mounted at regular spaced intervals along the length of the axle, and wherein the mounting means for each of the disks is of the same construction.

Each disk-mounting means is shown in Fig. 3 and 4 as comprising a member, in the form of a bearing sleeve 17, the internal diameter of which is greater than the diameter of the axle 15 so that the two are relatively movable transversely of each other. The sleeve 17 is secured in a fixed position longitudinally on the axle by means of two fastening members 18 in the form of pins extending transversely through the sleeve and having swaged ends 18a by which they are fixedly secured to the sleeve. To slidably receive each pin 18 so that the axle 15 and the sleeve 17 can be transversely moved relatively, the axle is diametrically bored as at 15a.

The periphery of the sleeve 17 is provided at a point between the pins 18 with an annular shoulder 19, and spaced from the shoulder the sleeve is formed with an annular groove 20 for the reception of a split locking ring 21.

The cutting disk 16 is mounted for rotation on the bearing sleeve 17 and between a pair of annuli 22 which are in the form of relatively thick rings. As mounted on the sleeve one annulus abuts the shoulder 19, while the other annulus is engaged by the locking ring 21, and thus the two annuli are held in such positions as to secure the disk 16 in a position perpendicular to the axle 15, yet allowing free rotation thereof on the axle.

A resilient means is provided for yieldably urging the sleeve 17, and as a consequence the cutting disk 16, to a transversely elevated position on the axle 15, in order that the cutting disk may operate in the manner intended as will be described hereinafter. This resilient means comprises in this instance two helical compression springs 23 mounted on the pins 18 between the lower side of the axle 15 and the inner lower side of the sleeve 17. The upper ends of the springs are received in pockets 24 formed in the underside of the axle 15.

In use of the dough cutting device it is adapted to be manually moved over the surface 25a of a table 25 on which, as shown in Fig. 1, a sheet 26 of dough has been laid for cutting. To facilitate use of the device, a pair of handles 27 are fixed to the axle 15 at the points shown by means of sleeves 28 fixed to the handles and to the axle by means of set screws 29. It will be noted that the handles are in converging relation one to the other so that the impelling forces exerted by the operator on the axle will be toward each other and generally to the center of the axle. Thus in operating the device the operator tends to so push the axle forwardly over the table in a path perpendicular to the axle so that the cutting disks are caused to cut the dough in straight strips of uniform and equal width.

In order to illustrate how my device may cut dough under conditions which frequently exist and render impossible the cutting of dough by a conventional device in which the cutting disks and axle are not relatively movable transversely of each other, I have shown the table surface 25a, which is usually made of wood, and hence subject to being uneven, and the dough sheet 26 of uneven thickness.

As the device is moved over the table under the aforesaid conditions, the operator, through the handles 27, exerts a pressure uniformly downward on the axle sufficient to cause the edges of the cutting disks to penetrate and cut the dough sheet as they rotate on the non-rotating axle. Under such downward pressure the sets of springs 23 for the individual cutting disks are compressed to various degrees allowing the disks to be individually elevated in varying degrees on the axle to compensate for variations in dough thickness and table surface unevenness, as the disks are rolled over the table. In this manner the cutting edges of all of the disks are caused to simultaneously penetrate and cut the dough sheet irrespective of dough thickness or table surface uneveness.

In Fig. 5 is shown another means for yieldably urging the cutting disk 16 to a down position on the axle 15. Thus when a series of disks are mounted on the axle as in Fig. 1 by such means, the device will provide the same dough cutting advantages as described in connection with the device of Fig. 1.

In this alternative form of my invention a plurality of pins 18 are secured in the bearing sleeve 17 at opposite sides of the disk 16 and so as to extend through openings in the axle 15 suitable to allow movement of the sleeve transversely of the axle. Helical compression springs 23a, one on each of the pins 18, are provided to urge the sleeve to the downward position shown, and to yield when downward pressure is exerted on the axle so that the disk can be maintained in cutting engagement with the dough as laid on the table regardless of variation of dough thickness or unevenness in the surface of the table or both.

I claim:

1. In a dough cutting device: an axle; a sleeve on the axle having an internal diameter greater than the diameter of the axle; fastening members for securing the sleeve to the axle and extending freely through the axle to allow relative transverse movement of the sleeve and axle; compression springs on the fastening members between the sleeve and axle for urging the sleeve transversely to one position on the axle; a pair of annuli mounted on said sleeve between said fastening members; and a cutting disk between and embraced by said annuli.

2. In a dough cutting device as embodied in claim 1, wherein means is provided for securing said annuli in fixed position lengthwise of the sleeve, said means comprising an annular shoulder on the sleeve engaging the outer end face of one of said annuli and a split ring on the sleeve engaging the outer end face of the other annulus whereby the cutting disk is free to rotate on the sleeve.

References Cited in the file of this patent

UNITED STATES PATENTS

| | | |
|---|---|---|
| 850,040 | McManus | Apr. 9, 1907 |
| 2,356,872 | Monaco | Aug. 29, 1944 |
| 2,638,856 | Hubbard | May 19, 1953 |

FOREIGN PATENTS

| | | |
|---|---|---|
| 556,030 | Great Britain | Sept. 16, 1943 |